United States Patent
Lee et al.

(10) Patent No.: US 9,666,189 B2
(45) Date of Patent: May 30, 2017

(54) VEHICLE AND METHOD OF CONTROLLING THE SAME

(71) Applicant: Hyundai Motor Company, Seoul (KR)

(72) Inventors: Jia Lee, Gyeonggi-Do (KR); Jung Mi Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/852,583

(22) Filed: Sep. 13, 2015

(65) Prior Publication Data

US 2016/0240189 A1    Aug. 18, 2016

(30) Foreign Application Priority Data

Feb. 16, 2015    (KR) .................. 10-2015-0023348

(51) Int. Cl.
*G10L 15/22*    (2006.01)

(52) U.S. Cl.
CPC ........ *G10L 15/22* (2013.01); *G10L 2015/223* (2013.01)

(58) Field of Classification Search
CPC ............................... G10L 15/00; G10L 15/22
See application file for complete search history.

(56) References Cited

U.S. PATENT DOCUMENTS

| 2008/0015863 | A1* | 1/2008 | Agapi | G10L 15/22 |
| | | | | 704/275 |
| 2008/0046251 | A1* | 2/2008 | Agapi | G10L 15/07 |
| | | | | 704/275 |
| 2008/0140422 | A1* | 6/2008 | Hovestadt | G10L 15/26 |
| | | | | 704/275 |
| 2010/0312547 | A1* | 12/2010 | Van Os | G06F 3/167 |
| | | | | 704/9 |
| 2015/0169284 | A1* | 6/2015 | Quast | G06F 3/167 |
| | | | | 704/275 |

FOREIGN PATENT DOCUMENTS

| JP | 2001-027540 A | 1/2001 |
| JP | 2007-240688 A | 9/2007 |
| KR | 10-2008-0023390 A | 3/2008 |
| KR | 2013-0068922 | 12/2011 |
| KR | 2014-0113263 | 9/2014 |
| KR | 2014-0119478 | 10/2014 |

* cited by examiner

*Primary Examiner* — Douglas Godbold
(74) *Attorney, Agent, or Firm* — Mintz Levin Cohn Ferris Glovsky and Popeo, P.C.; Peter F. Corless

(57) ABSTRACT

A vehicle and a method of controlling the vehicle are provided. The method includes recognizing a user speech to acquire a voice command and searching for a shortcut instruction that corresponds to the voice command. Further, the method includes executing a plurality of control instructions based on a control process of the shortcut instruction.

19 Claims, 18 Drawing Sheets

FIG. 4

|   | SHORTCUT COMMAND | CONTROL PROCESS |
|---|---|---|
| 1 | GAS STATION | SEARCH FOR NEARBY GAS STATION |
| 2 | LET'S GO HOME | SEARCH FOR ROUTE TO HOME |
|   |   | MAKE PHONE CALL HOME |
| 3 | I'M SLEEPY | OPEN WINDOWS |
|   |   | PLAY MUSIC |
| 4 | I'M COLD | TURN ON HOT WIRE OF SEAT |
|   |   | SET TEMPERATURE OF AIR CONDITIONER TO 29°C |

VEHICLE AND METHOD OF CONTROLLING THE SAME

CROSS-REFERENCE TO RELATED APPLICATION

This application claims the benefit of Korean Patent Application No. 10-2015-0023348, filed on Feb. 16, 2015 in the Korean Intellectual Property Office, the disclosure of which is incorporated herein by reference.

BACKGROUND

1. Field

The present invention relates to a vehicle controllable through speech recognition and a method of controlling the vehicle.

2. Description of the Related Art

In addition to the fundamental driving function, a vehicle provides a variety of additional functions for user convenience. For example, a vehicle provides additional functions, such as a navigation function, a multimedia function, an air conditioning function, a jet control function, and a telephone function. Such additional functions may be controlled through a manipulation system disposed within a vehicle, or using a speech recognition device disposed within the vehicle. However, control of additional functions generally involves complex manipulation of several stages or a complex speech recognition operation.

SUMMARY

Therefore, the present invention provides a vehicle that is controllable using voice, and a method of controlling the vehicle. Additional aspects of the invention will be set forth in part in the description which follows and, in part, will be obvious from the description, or may be learned by practice of the invention. In accordance with one aspect of the present invention, a method of controlling a vehicle may include: a speech recognition operation of recognizing a user speech to acquire a voice command; a search operation of searching for a shortcut instruction that corresponds to the voice command; and a control operation of executing a plurality of control instructions based on a control process of the shortcut instruction.

The control operation may further include executing the plurality of control instructions based on an execution order of the control process. In particular, the plurality of control instructions may be performed simultaneously or sequentially based on the execution order of the control process. The control operation may further include generating control signals that correspond to the plurality of control instructions and transferring the control signals to respective components of the vehicle. The search operation may include searching for a shortcut instruction that corresponds to at least a part of the voice command. In addition, the control operation may further include, when a plurality of shortcut instructions are detected, determining an execution order of control processes of the detected shortcut instructions.

The method may further include a registration operation of registering the voice command as a shortcut instruction when any shortcut instruction that corresponds to the voice command is not detected. The registration operation may include: providing an interface for inputting the plurality of control instructions; and generating the control process based on the plurality of input control instructions. The registration operation may further include determining an execution order of the control process based on an input order of the plurality of control instructions. The plurality of control instructions may be intended to operate at least one of a navigation function, a multimedia function, an air conditioning function, a seat function, a window function, and a phone connection function.

In accordance with another aspect of the present invention, a vehicle may include: a speech recognition unit configured to recognize speech to acquire a voice command; and a voice controller configured to search for a shortcut instruction that corresponds to the voice command, and execute a plurality of control instructions based on a control process of a detected shortcut instruction.

The voice controller may be configured to execute the plurality of control instructions based on an execution order of the control process. In particular, the plurality of control instructions may be performed simultaneously or sequentially based on the execution order of the control process. The voice controller may be configured to generate control signals that correspond to the plurality of control instructions and transfer the control signals to respective components of the vehicle. The voice controller may further be configured to search for a shortcut instruction that corresponds to at least a part of the voice command.

When a plurality of shortcut instructions are detected the voice controller may be configured to determine an execution order of the plurality of shortcut instructions. The voice controller may also be configured to register the voice command as a shortcut instruction when any shortcut instruction that corresponds to the voice command is not detected. The vehicle may further include a display configured to provide an interface for inputting the plurality of control instructions. In particular, the interface may include a state display area for displaying information regarding a currently displayed screen.

The voice controller may be configured to generate the control process based on the plurality of control instructions input through the display. The voice controller may also be configured to determine an execution order of the control process based on an order in which the plurality of control instructions are input (e.g., received by a user). The plurality of control instructions may be intended to operate at least one of a navigation function, a multimedia function, an air conditioning function, a seat function, a window function, and a phone connection function. The vehicle may further include a command database configured to store a plurality of shortcut instructions.

In accordance with another aspect of the present invention, a method of controlling a vehicle may include: recognizing speech to acquire a voice command (e.g., detecting a user speech); receiving a plurality of control instructions from the user, and generating a control process based on the plurality of control instructions; and registering the voice command and the control process as a shortcut instruction.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 4 is a table showing an example of a command database of a vehicle according to an exemplary embodiment of the present invention;

DETAILED DESCRIPTION

Figure 1:
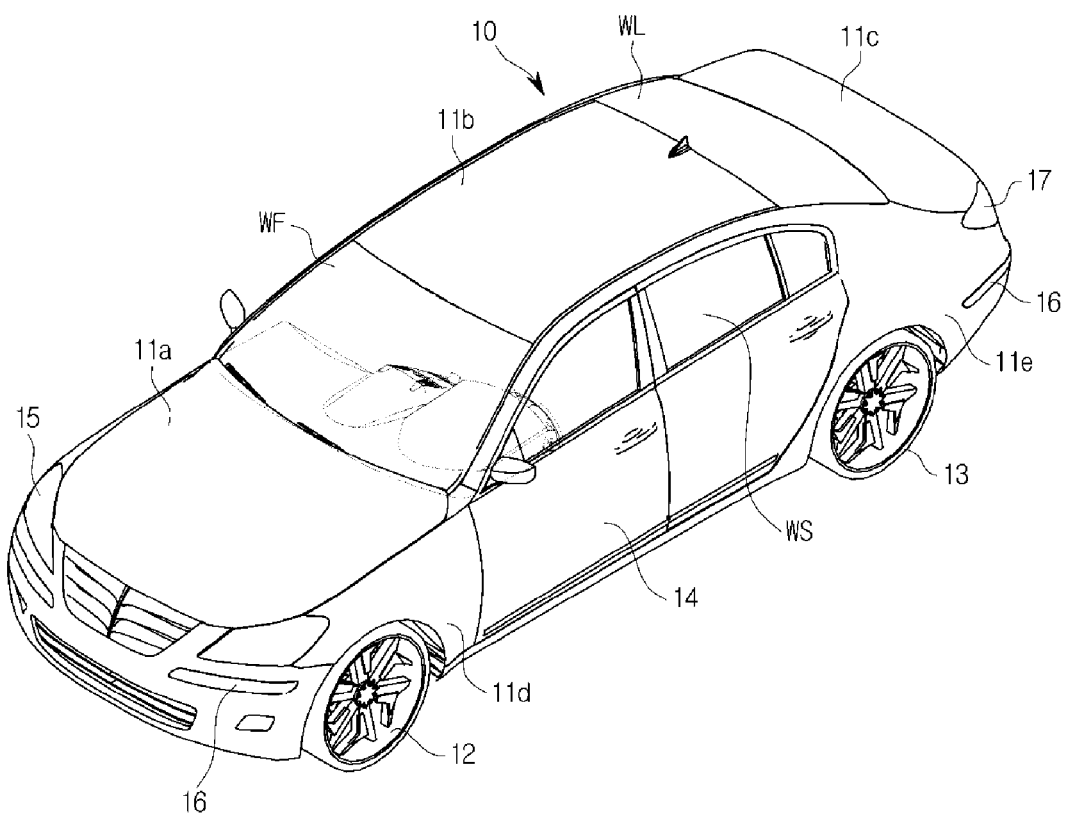
FIG. 1 is a schematic diagram showing the exterior of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The advantages, features and methods for achieving the foregoing will be apparent from the accompanying drawings and exemplary embodiments described below. However, the present invention is not limited to the exemplary embodiments disclosed below, and can be implemented in various different forms. These exemplary embodiments are provided so that this disclosure will be thorough and complete, and will fully convey the scope of the invention to those of ordinary skill in the art to which the present invention pertains. It is intended that the present invention be limited only by the claims.

Hereinafter, exemplary embodiments of the present invention will be described in detail with reference to the accompanying drawings so that those of ordinary skill in the art can readily implement the exemplary embodiments. For clear description of the present invention, parts not related to the description will be omitted from the drawings.

Figure 2:
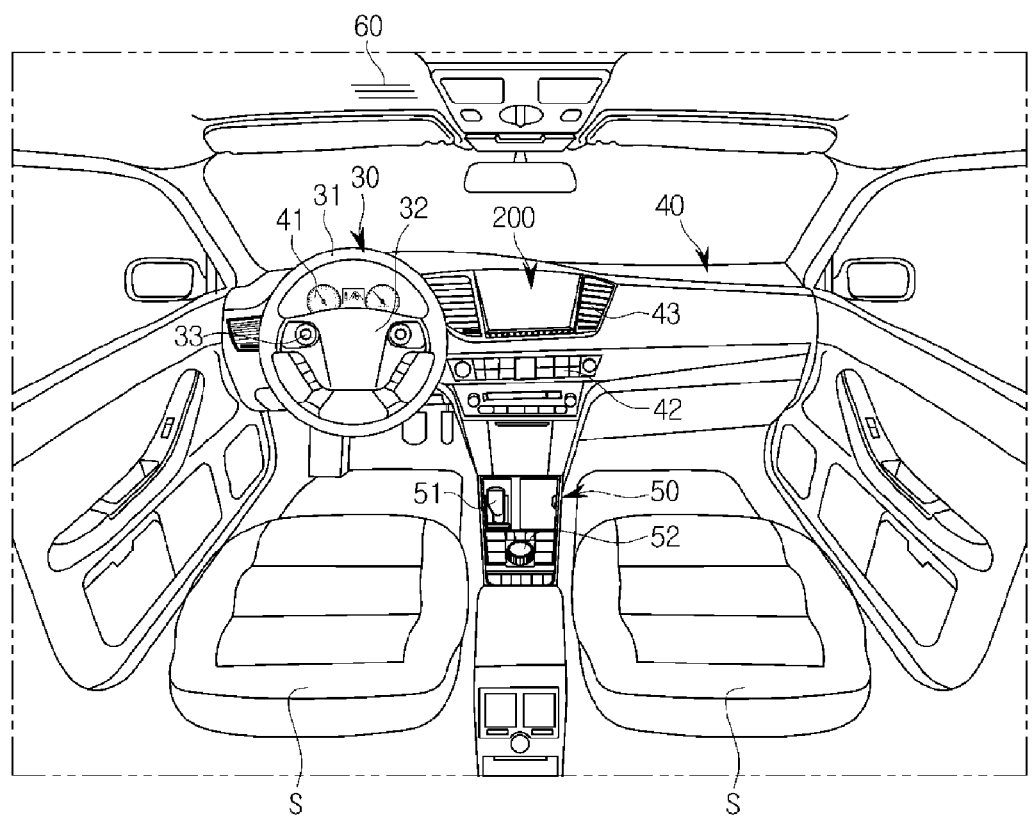
FIG. 2 is a schematic diagram showing the interior of the vehicle according to the exemplary embodiment of the present invention.

FIG. 1 is a schematic diagram showing the exterior of a vehicle according to an exemplary embodiment, and FIG. 2 is a schematic diagram showing the inside of the vehicle according to the exemplary embodiment. As shown in FIG. 1, a vehicle 10 may include a car body 11 that forms the appearance of the vehicle 10, and wheels 12 and 13 configured to move the vehicle 10. The car body 11 may include a hood 11a that protects various devices, such as an engine for driving the vehicle 10, a loop panel 11b forming an interior space, a trunk lid 11c under which a storage space is provided, and front fenders 11d and quarter panels 11e disposed on sides of the vehicle 10. Additionally, a plurality of doors 14 coupled with the car body 11 by hinges may be disposed on the sides of the car body 11.

A front window WF allowing a driver to see in front of the vehicle 10 may be disposed between the hood 11a and the loop panel 11b, and a rear window WL allowing the driver to see behind the vehicle 10 may be disposed between the loop panel 11b and the trunk lid 11c. In addition, hot wires may be disposed in the front window WF and the rear window WL to defrost the windows WF and WL. Further, side windows WS allowing the driver to see beside the vehicle 10 may be disposed in upper portions of the doors 14. The side windows WS may move up or down by operation of actuators disposed within the doors 14.

A plurality of headlamps 15 may be disposed at the front of the vehicle 10 to emit light in the travelling direction of the vehicle 10. In particular, the headlamps 15 may operate in a low beam mode to emit light in a close distance (e.g., within about 30 m) from the vehicle 10 or a high beam mode to emit light in a relatively long distance (e.g., within about 100 m) from the vehicle 10. Additionally, turn signal lamps 16 configured to indicate the travelling direction of the vehicle 10 may be disposed in the front and the back of the vehicle 10. The vehicle 10 may indicate the travelling direction thereof to other surrounding vehicles or pedestrians by turning the turn signal lamps 16 on and off. Further, tail lamps 17 may be disposed in the back of the vehicle 10 to represent a shift of a gearshift, a brake operation, or the like.

As shown in FIG. 2, the vehicle interior may include a plurality of seats S, a steering wheel 30 configured to control the direction of the vehicle 10, a dashboard 40 configured to control operation of the vehicle 10 and in which various instruments showing travel information of the vehicle 10 are provided, and a gearbox 50 disposed at the lower end of the dashboard 40.

The seats S may include a driver seat, a front passenger seat, and rear passenger seats disposed in the back of the vehicle 10. The seats S may include a heating device or a ventilation device. The heating device may be configured to heat the seats S, providing a warm seat environment. The ventilation device may be configured to suction or discharge air through apertures formed in the seats S. The steering wheel 30 may include a rim 31 grasped by the driver, and a spoke 32 that connects the rim 31 and a hub of a steering device positioned on a rotation axis for steering. The driver may rotate the spoke 32 and change the direction of wheels by manipulating the rim 31, thereby adjusting the travelling direction of the vehicle 10.

In addition, a first manipulation unit 33 may be further provided in the steering wheel 30. Using the first manipulation unit 33, a user may control settings of the vehicle 10 or input a control instruction to the vehicle 10. For example, the user may start speech recognition using the first manipulation unit 33. Further, the first manipulation unit 33 may include an input device, such as a push button, a membrane button, or a dial. To receive speech of the user, a voice receiving unit 60 may be disposed within the vehicle. In particular, the voice receiving unit 60 may include a microphone configured to convert a voice signal of the user into an electric signal. The voice receiving unit 60 may also include a noise removal filter configured to remove (e.g., filter) noise of the voice signal.

The dashboard 40 may include a cluster 41 configured to display the travelling speed, the engine revolutions per minute (RPM), the amount of remaining fuel, etc. of the vehicle 10, a center fascia 42 in which manipulation devices for adjusting an audio/video system and an air conditioner are installed, and an air vent 43 through which air may flow into the vehicle interior. The gearbox 50 in which a gear system is embedded may be disposed under the center fascia 42. In addition, a gearshift 51 used to change gears may protrude from the gearbox 50. Additionally, a second manipulation unit 52 for the driver to input a variety of instructions for manipulating various functions of the vehicle 10 may be disposed in the gearbox 50. The second manipulation unit 52 may include at least one of a knob, a physical button, a joystick, a lever, a trackball, an operation wheel, an operation sensor, an object sensor, and a touch sensor, but is not limited thereto.

Moreover, a display 200 may be disposed at the center of the center fascia 42 to display information related to the vehicle 10 and provide an interface for receiving a control instruction. The display 200 may be implemented as a liquid crystal display (LCD) panel, a light-emitting diode (LED) panel, an organic light-emitting diode (OLED) panel, or so on. Additionally, a touch panel may be provided in the display 200 to receive a touch input of the user.

Figure 3:
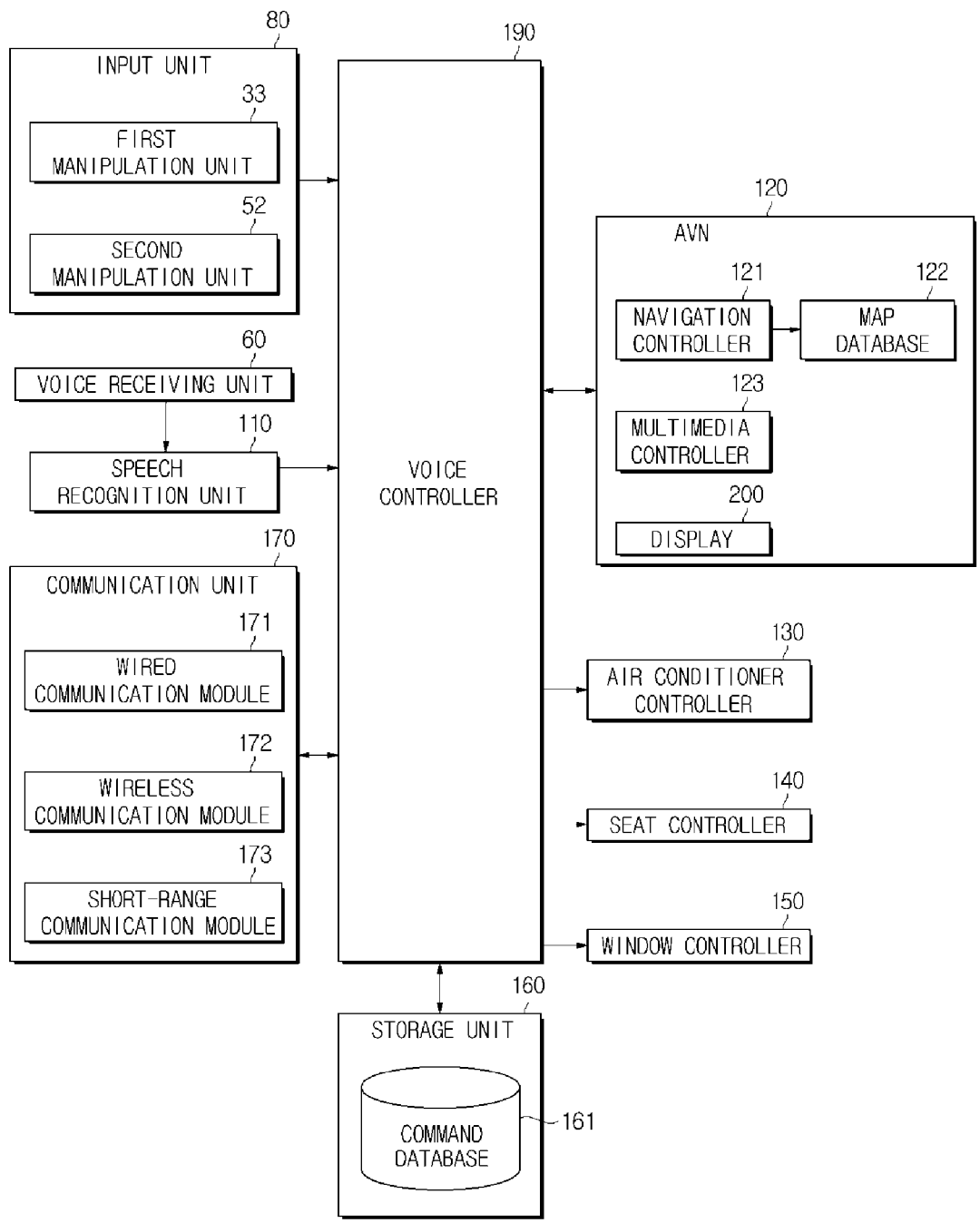
FIG. 3 is a control block diagram showing the main constitution of the vehicle according to the exemplary embodiment of the present invention.

FIG. 3 is a control block diagram showing the main constitution of the vehicle according to the exemplary embodiment. The control process as shown in FIG. 3 may be executed by a centralized controller, an upper controller, or the like. Referring to FIG. 3, the vehicle 10 according to the exemplary embodiment may include an input unit 80 configured to receive a control instruction of the user (e.g., through an input), a speech recognition unit 110 configured to recognize speech of the user, a communication unit 170 configured to communicate with external devices, an audio/video navigation (AVN) 120 configured to provide a user-convenience function, an air conditioner controller 130 configured to operate the air conditioner of the vehicle 10, a seat controller 140 configured to operate the seats S of the vehicle 10, a window controller 150 configured to operate windows W of the vehicle 10, a storage unit 160 configured to store data necessary to operate the vehicle 10, and a voice controller 190 configured to operate the vehicle 10 based on a received speech instruction.

The input unit 80 may be configured to receive a control instruction input by the user, and output an electric signal that corresponds to the received control instruction. The input unit 80 may include the first and second manipulation units 33 and 52 described above. The user may change or adjust various settings of the vehicle 10 by manipulating the input unit 80. The speech recognition unit 110 may be configured to recognize speech of the user to acquire a voice command. Speech of the user input through the voice receiving unit 60 may be input to the speech recognition unit 110. The speech recognition unit 110 may be configured to recognize the speech (e.g., detect a voice input) to acquire a voice command in a form which may be recognized by the voice controller 190 and to which the voice controller 190 may react, and transmit the acquired voice command to the voice controller 190.

Specifically, the speech recognition unit 110 may be configured to extract an actual voice period by detecting a start point and an end point of phonetic information in the input speech. Then, the speech recognition unit 110 may be configured to extract a feature vector from the extracted actual voice period using a Cepstrum technique, a linear predictive coding (LPC) technique, a Mel-Frequency Cepstral Coefficient (MFCC) technique, a filter bank energy technique, or the like. The speech recognition unit 110 may be configured to recognize the speech of the user by applying a previously stored acoustic model or language model to the feature vector extracted from the voice period. An acoustic model may be obtained by modeling feature vectors of phonemes, and may be used to determine which phoneme a feature vector extracted from a voice period corresponds to. A language model may be obtained by modeling a language sequence relationship of words or syllables, and may reduce errors in speech recognition by reducing acoustic vagueness.

Further, the speech recognition unit 110 may be configured to recognize speech using a known speech recognition algorithm or speech recognition engine as well as the above-described recognition method. The speech recognition 110 may also be configured to recognize speech using a speech recognition algorithm or a speech recognition engine that will be developed along with technological progress in the future. The speech recognition unit 110 may correspond to at least one processor. In particular, the processor may be implemented as an array of a plurality of logical gates, or a combination of a general-use microprocessor and a memory configured to store a program executable by the microprocessor. Those of ordinary skill in the art to which the present invention pertains would appreciate that the processor may be implemented in other forms of hardware.

The communication unit 170 may be configured to exchange data with external devices. Specifically, the communication unit 170 may be connected with an external device to receive data from the external device or transmit data to the external device. To communicate with external devices, the communication unit 170 may include at least one of a wired communication module 171, a wireless communication module 172, and a short-range communication module 173. The wired communication module 171 may be configured to connect an external device and the communication unit 170 using a wired communication method, for example, peripheral component interconnect (PCI), PCI-express, and universal serial bus (USB).

Further, the wireless communication module 172 may be configured to connect an external device and the communication unit 170 using a wireless communication method. For example, using global system for mobile communication (GSM)/third generation partnership project (3GPP)-based communication methods (GSM, high-speed downlink packet access (HSDPA), and long term evolution (LTE) advanced), third generation partnership project 2 (3GPP2)-based communication methods (code division multiple access (CDMA), etc.), worldwide interoperability for microwave access (WiMAX), or a global positioning system (GPS), the wireless communication module 172 may connect to a communication network.

The short-range communication module 173 may be configured to connect an external device and the communication unit 170 using a short-range communication method. For example, using Bluetooth, Bluetooth low energy, infrared data association (IrDA), Zigbee, wireless fidelity (Wi-Fi), Wi-Fi direct, ultra wideband (UWB), or near field communication (NFC), the short-range communication module 173 may connect an external device and the communication unit 170. For example, the communication unit 170 may be connected to a portable terminal disposed within the vehicle using Bluetooth, to provide the driver of the vehicle 10 within communication without holding the portable terminal.

The storage unit 160 may be configured to store data related to travel of the vehicle 10 and may include a hard disk, a flash memory, a high-speed random access memory (RAM), a static random access memory (SRAM), a dynamic random access memory (DRAM), a read-only memory (ROM), etc., but is not limited thereto. The storage unit 160 may be attached to and detached from the vehicle 10. For example, the storage unit 160 may include a compact flash (CF) card, a secure digital (SD) card, a smart media (SM) card, a multimedia card (MMC), or a memory stick, but is not limited thereto. Additionally, the storage unit 160 may further include a command database 161 set by the user.

FIG. 4 is a table showing an example of a shortcut database of a vehicle according to an exemplary embodiment. Referring to FIG. 4, the command database 161 may be configured to store at least one shortcut instruction. The shortcut instruction may have been registered by the user, but is not limited thereto. For example, the shortcut instruction may have been registered by the manufacturer of the vehicle 10. The shortcut instruction may include a shortcut command for executing the shortcut instruction, and a control process for vehicle control. The control process may be a set of control instructions for comprehensively operating a vehicle, and may include a plurality of control instructions for operating a vehicle. The control process may further include information regarding an execution order of the plurality of control instructions, which may be performed simultaneously or sequentially based on the execution order.

The AVN 120 may be configured to provide user-convenience functions in an integrated manner based on a control instruction. Specifically, the AVN 120 may include a navigation controller 121 configured to provide a navigation service, a multimedia controller 123 configured to provide multimedia, and the display 200 for interacting with the user. The navigation controller 121 may be configured to display the location of the vehicle 10 on the display 200. In the navigation service, the current location of the vehicle 10 may be calculated based on location information received from at least one global positioning system (GPS). The navigation controller 121 may also be configured to display the calculated location of the vehicle 10 on a map stored in a map database 122.

Further, the navigation controller 121 may be configured to display a travel route toward a destination through the display 200. The navigation controller 121 may be configured to search for a travel route from the current location of the vehicle 10 to the selected destination and display a detected travel route. The travel route may be detected using a previously stored route search algorithm. Moreover, the navigation controller 121 may also be configured to search for a plurality of travel routes and provide a travel route selected by the user among the plurality of travel routes. For example, the navigation controller 121 may be configured to search for and provide each of the shortest-distance route, the shortest-time route, and a high-speed travel route to the destination.

The multimedia controller 123 may be configured to provide multimedia content to the user. Specifically, the multimedia controller 123 may be configured to provide audio content, such as a radio broadcast, a compact disc (CD), and a Moving Picture Experts Group (MPEG) Audio Layer-3 (MP3) file, or video content, such as a digital versatile disc (DVD), but is not limited thereto. The air conditioner controller 130 may be configured to operate the air conditioner disposed within the vehicle 10 based on a control instruction to adjust the vehicle interior to a set temperature. Based on the actual temperature of the vehicle interior and the set temperature, the air conditioner controller 130 may be configured to determine a temperature to which air may be adjusted by the air conditioner. The air conditioner may be configured to generate the chill or warmth (e.g., cool or warm air) to adjust air to the temperature determined by the air conditioner controller 130, and to provide the temperature-adjusted air to the vehicle interior.

Additionally, the air conditioner controller 130 may be configured to adjust the volume (e.g., the amount of air flow) and the direction of air flowing into the vehicle interior. The volume and the direction of air may be adjusted by the user, or may be automatically adjusted by the air conditioner controller 130. For example, the air conditioner controller 130 may be configured to adjust the volume of air based on a difference between the set temperature and the actual temperature. Further, the air conditioner controller 130 may be configured to adjust the direction of air to discharge cold air upward and discharge warm air downward.

The seat controller 140 may be configured to adjust the seats S disposed within the vehicle 10 based on a control instruction. The seat controller 140 may be configured to adjust the positions of the seats S or the heating device or the ventilation device disposed in the seats S. The window controller 150 may be configured to operate the windows W (e.g., move the windows up and down) disposed within the vehicle 10 based on a control instruction. The window controller 150 may be configured to operate a hot wire provided in the front window WF or the rear window WL, or adjust movement of the side windows WS. The voice controller 190 may be configured to operate respective components of the vehicle 10 based on a shortcut instruction. Since a shortcut instruction may include a control process of a plurality of control instructions as mentioned above, the voice controller 190 may be configured to comprehensively operate the vehicle 10 based on a shortcut instruction (e.g., the voice controller 190 may operate as the upper controller).

The above-described controllers may correspond to one or more processes or driver circuits for operating respective components. For convenience of explanation, FIG. 3 shows that the navigation controller 121, the multimedia controller 123, the air conditioner controller 130, the seat controller 140, the window controller 150, and the voice controller 190 are provided separately. However, one controller may be configured to simultaneously perform functions of a plurality of controllers, or a plurality of controllers may be configured to perform functions of one controller in a distributed manner.

Registration and execution of a shortcut instruction will be described in detail below.

Figure 5:
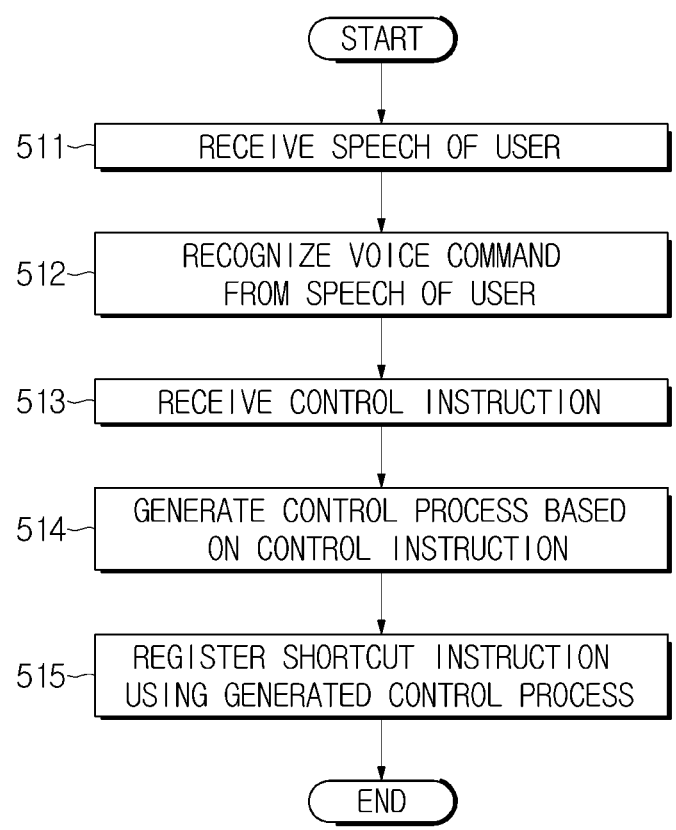
FIG. 5 is a flowchart illustrating a method of registering a vehicular shortcut instruction according to an exemplary embodiment of the present invention.
Figure 6:
FIG. 6 is an example diagram of a speech recognition guide screen according to an exemplary embodiment of the present invention.
Figure 7:
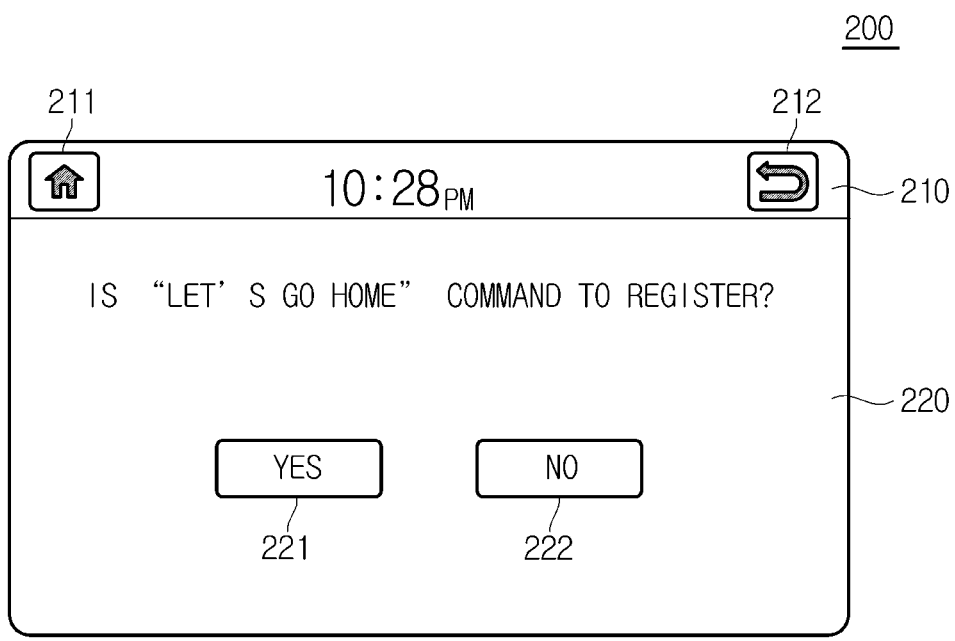
FIG. 7 is an example diagram of a confirmation screen of a voice command acquired by recognizing speech of a user according to an exemplary embodiment of the present invention.

FIG. 5 is a flowchart illustrating a method of registering a vehicular shortcut instruction according to an exemplary embodiment, FIG. 6 is an example diagram of a speech recognition guide screen, and FIG. 7 is an example diagram of a confirmation screen of a voice command acquired by recognizing speech. Referring to FIG. 5, when speech recognition is started, the vehicle 10 may be configured to receive a speech input (511). In response to receiving the speech input, the voice receiving unit 60 may be configured to convert the input speech into an electric signal and output the electric signal. Speech reception may be started by an input of the user. For example, speech reception may be started when the user engages a speech recognition button disposed in the first manipulation unit 33.

Meanwhile, when speech recognition is started, the display 200 may be configured to display a speech recognition guide screen as shown in FIG. 6. The speech recognition guide screen may include a state display area 210 and an information display area 220. In the state display area 210, a state message (e.g., time), a home icon 211 for directly moving to a main menu screen, and a back icon 212 for moving back to a previous screen may be displayed. The user may select the home icon 211 to move to the main screen, or may select the back icon 212 to move to a previous screen. In the information display area 220, a guide for registering a shortcut instruction may be displayed.

The vehicle 10 may be configured to acquire a voice command from the speech of the user (512). To acquire a voice command, speech recognition may be performed. The speech recognition may be performed using a previously set speech recognition algorithm or speech recognition engine, and as a result of such speech recognition, the voice command that may be recognized and processed by the voice controller 190 may be acquired. When the voice command is acquired, the display 200 may be configured to display a voice command confirmation screen as shown in FIG. 7. The voice command confirmation screen may confirm whether a voice command input by the user has been correctly input (e.g., input without error or with minimal error), and may include a state display area 210 and an information display area 220. The state display area 210 is the same as the state display area 210 of FIG. 6, and thus the detailed description thereof will be omitted.

The information display area 220 may be configured to display the acquired voice command (e.g., let's go home). Additionally, the information display area 220 may include a confirmation icon 221 and a correction icon 222. When the confirmation icon 221 is selected, the process may proceed to a control process generation operation (514), and when the correction icon 222 is selected, a screen shown in FIG. 6 may be displayed, and speech recognition may be repeated (513). The vehicle 10 may be configured to receive a control instruction from the user (513). To facilitate input of a control instruction, the vehicle 10 may include a user interface through which user input may be received. With reference to FIGS. 8 to 11, an exemplary embodiment of the user interface will be described below.

Figure 8:
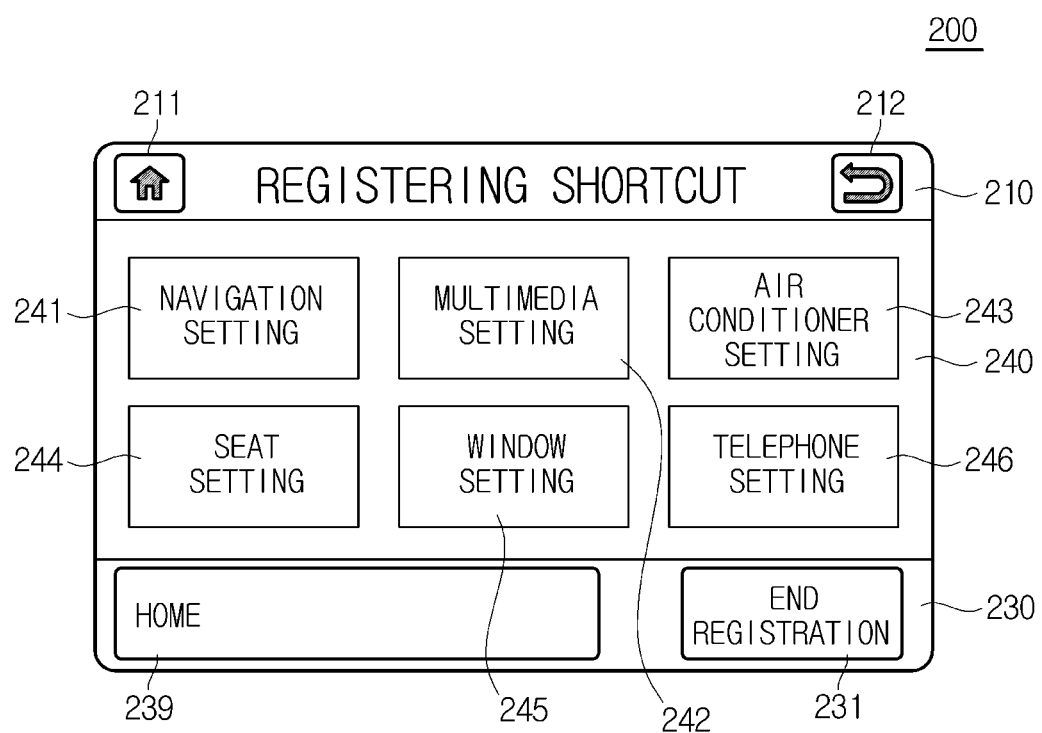
FIG. 8 is an exemplary diagram of the main screen of a user interface for vehicle setting according to an exemplary embodiment of the present invention.
Figure 9A:
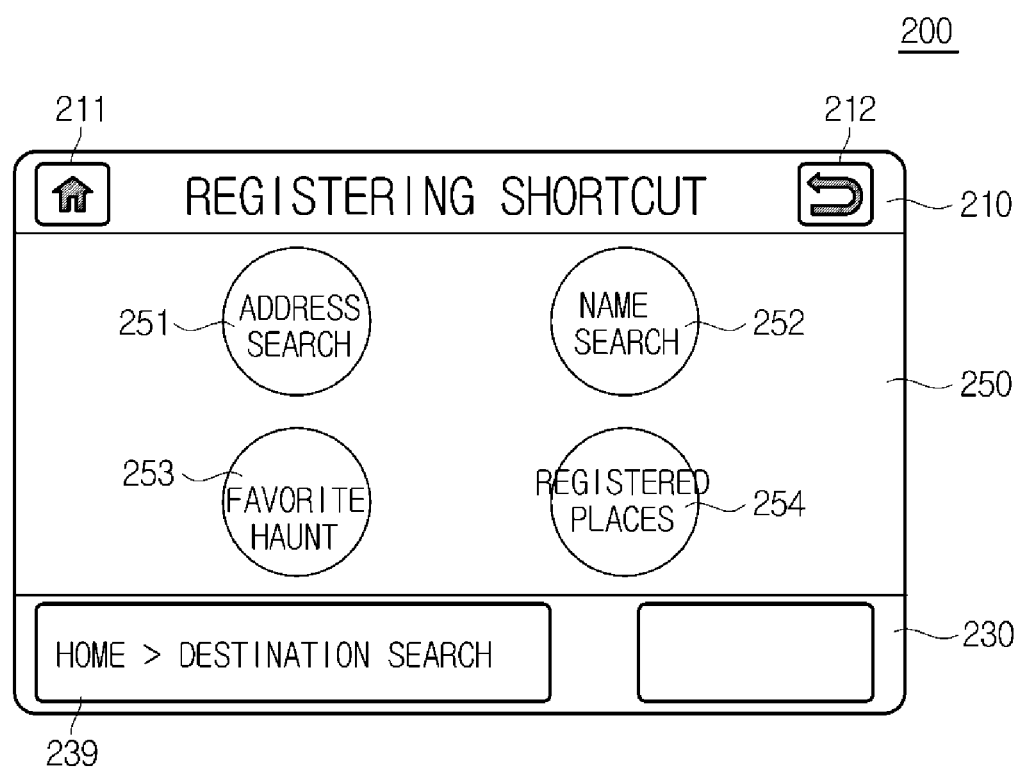
FIGS. 9A-9C are exemplary diagrams of a user interface for navigation setting according to an exemplary embodiment of the present invention.
Figure 9B:
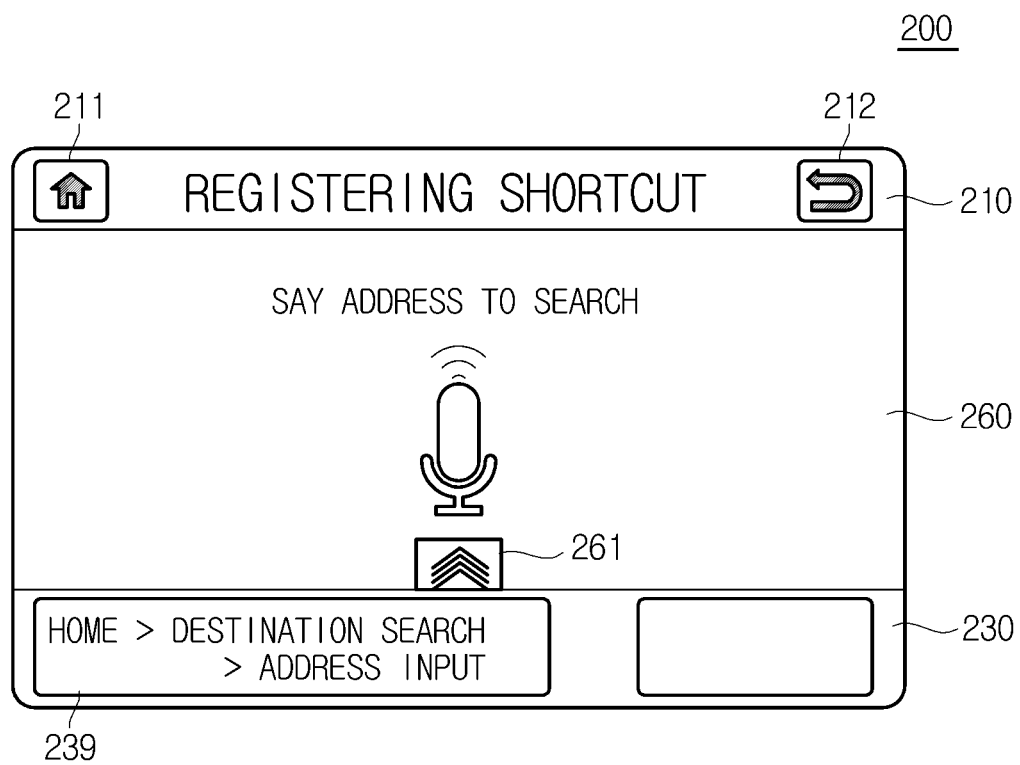
Figure 9C:
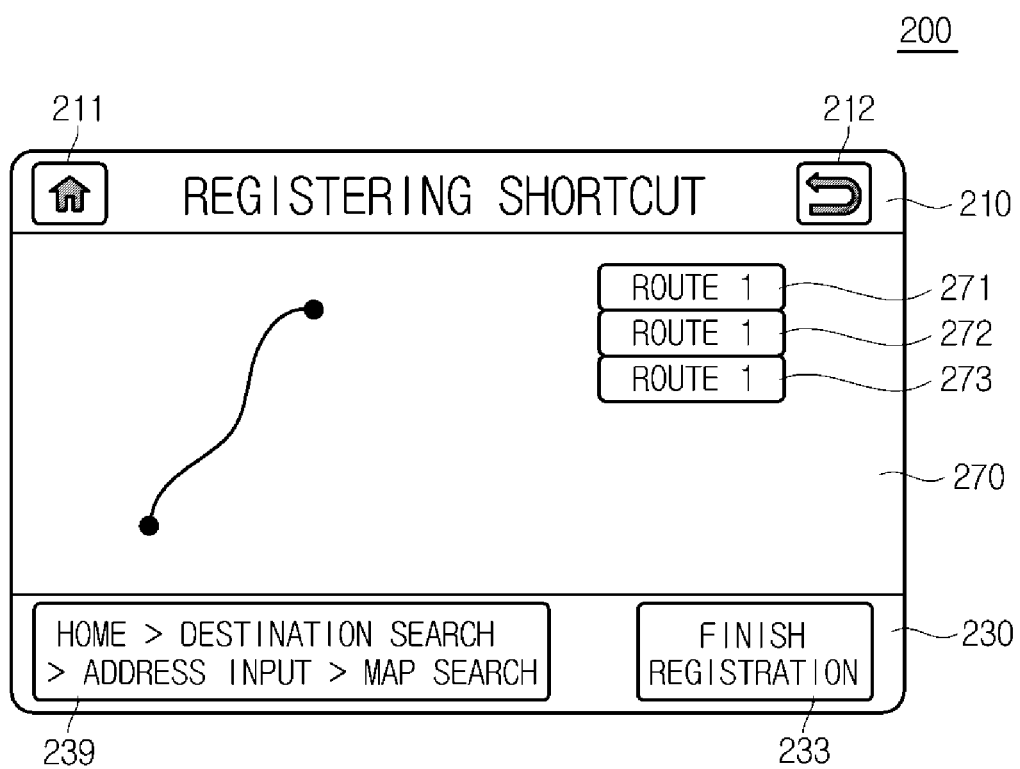
Figure 10:
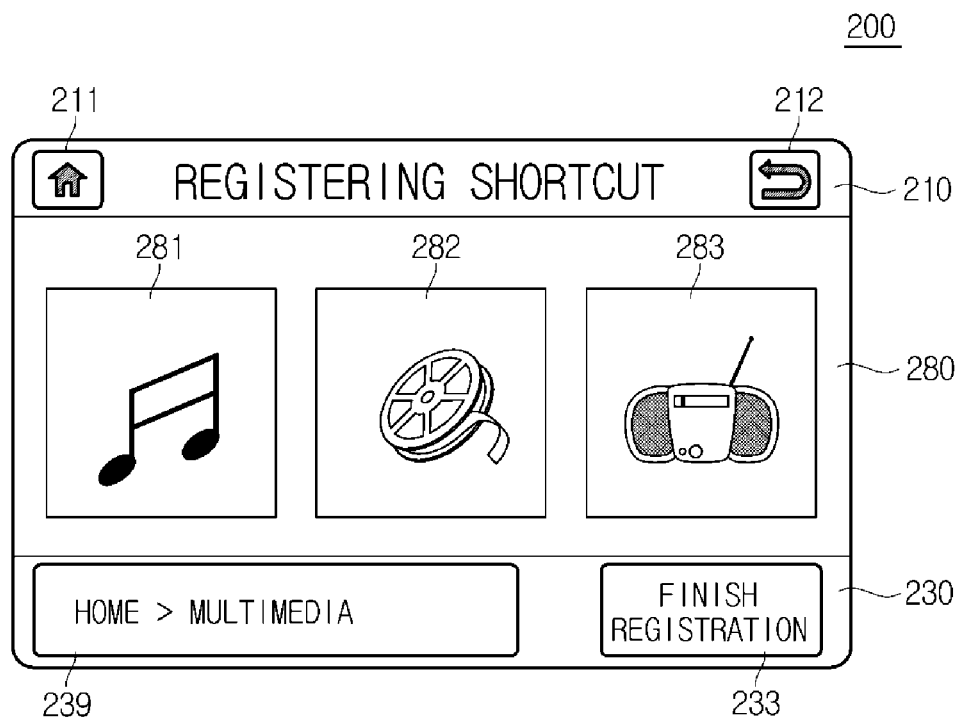
FIG. 10 is an exemplary diagram of a user interface for multimedia setting according to an exemplary embodiment of the present invention.
Figure 11:
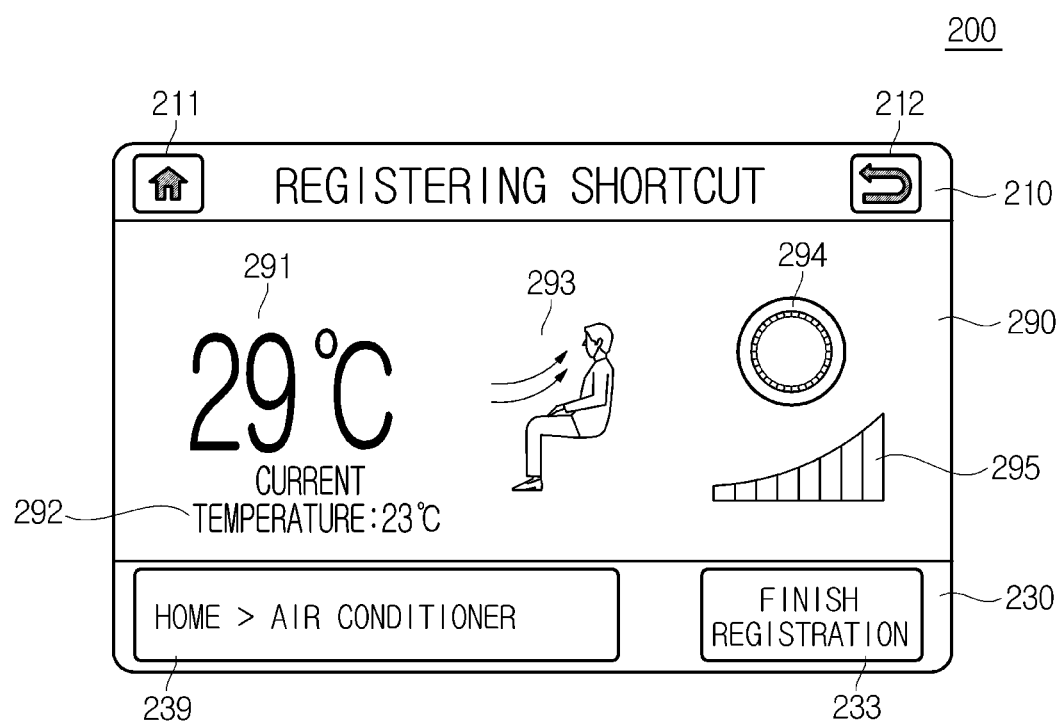
FIG. 11 is an exemplary diagram of a user interface for air conditioner setting according to an exemplary embodiment of the present invention.

FIG. 8 is an example diagram of the main screen of a user interface for vehicle setting, FIGS. 9A-9C are example diagrams of a user interface for navigation setting, FIG. 10 is an example diagram of a user interface for multimedia setting, and FIG. 11 is an example diagram of a user interface for air conditioner setting.

The display 200 may be configured to display a menu screen as shown in FIG. 8. The menu screen may include a first state display area 210, and a menu display area 240. In the first state display area 210, a notification that the current screen is a screen for registering a shortcut instruction may be displayed. For example, "Shortcut registration is in progress" may be displayed in the first state display area 210 to notify the user that registration of a shortcut instruction is in process. Additionally, in the first state display area 210, a home icon 211 and a back icon 212 may be displayed.

In the second state display area 230, a path window 239 that shows the path of a currently displayed screen and a registration end icon 231 for finishing shortcut registration may be displayed. The path window 239 may be configured to show or display information regarding the currently displayed screen and may provide the user with a control instruction currently being registered. In the menu display area 240, various vehicular functions controllable by the user may be displayed. For example, a navigation setting icon 241 for navigation setting, a multimedia setting icon 242 for multimedia setting, an air conditioner setting icon 243 for air conditioner setting, a seat setting icon 244 for setting the seats S, a window setting icon 245 for setting the windows W, and a telephone setting icon 246 for operating or starting a phone connection may be displayed in the menu display area 240. The user may start setting of the vehicle 10 by selecting an icon that corresponds to a function to be set.

For example, when the navigation setting icon 241 is selected, the menu display area 240 may be changed to a destination search area 250 as shown in FIG. 9A, and information displayed in the path window 239 may also be changed to "Home>Destination search" corresponding to the current screen. A destination search method may then be selected using icons displayed in the destination search area 250. For example, by selecting one of an address search icon 251, a name search icon 252, a favorite haunt icon 253, and a registered place icon 254, a destination search method may be selected. When the address search icon 251 is selected, the destination search area 250 may be changed to an address search area 260 as shown in FIG. 9B, and information displayed in the path window 239 may also be changed accordingly. When the address search area 260 is displayed, the address of a place to be set as a destination may be input through voice (e.g., a voice input), but is not limited thereto.

Meanwhile, an address input method may be changed by selecting an extension icon 261. Specifically, when the extension icon 261 is selected, a keyboard for inputting an address may be displayed in the address search area 260, and the address of a destination may input by touching (e.g., applying pressure to) the displayed keyboard or using the input unit 80 operating in conjunction with the display 200. When an address is input, the navigation controller 121 may be configured to search for a travel route. A travel route detected by the navigation controller 121 may then be displayed through the display 200 as shown in FIG. 9C. Specifically, when a travel route is detected, the address search area 260 may be changed to a route display area 270, and information displayed in the path window 239 may also be changed accordingly.

When a plurality of travel routes are detected, a plurality of route selection icons 271, 272, and 273 may be displayed, and a travel route to which the user will be guided may be set using the plurality of route selection icons 271, 272, and 273. Then, the navigation setting may be complete by selecting a registration finish icon 233. When the registration finish icon 233 is selected, a plurality of control instructions input for navigation functions may be stored. For example, a plurality of control instructions input to search for a destination by the user, such as a destination search method, a destination address, and a travel route selection, may be stored.

Further, the display 200 may be configured to display the main screen shown in FIG. 8 again. The user may additionally input a vehicle setting by selecting one of the icons displayed in the main screen. When the multimedia setting icon 242 is selected, the menu display area 240 may be changed to a multimedia setting area 280 as shown in FIG. 10, and information displayed in the path window 239 may also be changed to correspond to the multimedia setting area 280.

The multimedia setting area 280 may include an audio setting icon 281, a video setting icon 282, and a radio setting icon 283. The multimedia setting area 280 may be changed to a screen for audio setting when the audio setting icon 281 is selected, a screen for video setting when the video setting icon 282 is selected, and a screen for radio setting when the radio setting icon 283 is selected. The icons 281, 282, and 283 displayed in the multimedia setting area 280 may be selected to input control instructions, etc. for multimedia setting, and the control instructions for multimedia setting may be stored by selecting the registration finish icon 233 when input of the control instructions is complete.

When the control instructions for multimedia setting are stored, the display 200 may be configured to display the main screen shown in FIG. 8 again. The user may additionally input a control instruction by selecting an icon displayed in the main screen, or complete input of a control instruction for setting a shortcut instruction by selecting the registration end icon 231. Meanwhile, when the air conditioner setting icon 243 is selected, the menu display area 240 may be changed to an air conditioner setting area 290 as shown in FIG. 11, and information displayed in the path window 239 may also be changed to correspond to the air conditioner setting area 290.

The air conditioner setting area 290 may be configured to display a set temperature 291 of the vehicle 10, a measured in-vehicle temperature 292 of the vehicle 10, and a wind direction 293. Additionally, the air conditioner setting area 290 may further include a temperature dial 294 used to adjust the set temperature 291 of the vehicle 10 and an air volume setting icon 295 used to adjust the intensity of air flowing into the vehicle interior. The air conditioner may be set by manipulation of the temperature dial 294 and the air volume setting icon 295. When the registration finish icon 233 is selected, control instructions for air conditioning functions may be stored. When registration of air conditioner settings is complete, information regarding the air conditioner settings may be stored, and the display 200 may be configured to display the main screen shown in FIG. 8 again.

Meanwhile, the seat S settings may be set in response to receiving a selection of the seat setting icon 244 of FIG. 8, input settings of the windows W may be set in response to receiving a selection of the window setting icon 245, or input settings for a Bluetooth phone connection may be set in response to receiving a selection of the telephone setting icon 246. Further, the display 200 may be configured to display a user interface that corresponds to each setting. A method of acquiring a control instruction is not limited to that described above.

Figure 12:
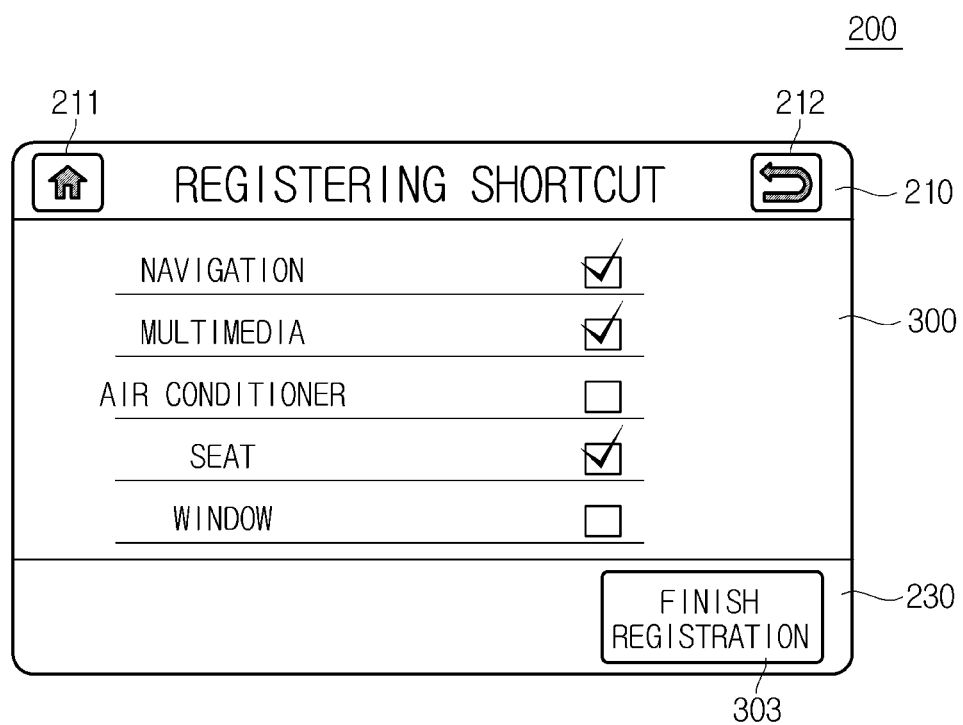
FIG. 12 shows a user interface displayed to acquire vehicular setting information according to another exemplary embodiment of the present invention.

FIG. 12 shows a user interface displayed to acquire vehicular setting information according to another exemplary embodiment. The voice controller 190 may be configured to acquire control instructions based on a current vehicle state. Specifically, the voice controller 190 may be configured to detect current vehicle settings and acquire control instructions based on the detected vehicle settings. In particular, the user interface shown in FIG. 12 may be provided. Referring to FIG. 12, the user interface may include a first state display area 210 and a selection area 300. In the selection area 300, vehicular functions, such as a navigation function, a multimedia function, an air conditioning function, a seat function, a window function, and a phone connection function, may be arranged, and a check boxes (e.g. or other areas and shapes for selection) for selecting the respective vehicular functions may be displayed. When the navigation, multimedia, and seat functions are selected the voice controller 190 may be configured to acquire and store control instructions that correspond to set states of the selected navigation, multimedia, and seat functions. For example, it may be possible to acquire a control instruction based on destination information and route search information of a navigation device, and a control instruction based on current setting information of the seats S.

Referring back to FIG. 5, the vehicle 10 may be configured to generate a control process based on the control instruction. The control process may include a plurality of control instructions input by the user, and may further include information regarding an execution order of the plurality of control instructions in some cases. In particular, the execution order of the control instructions may be determined based on an order in which the plurality of control instructions are input by the user.

Additionally, the execution order of the control instructions may be determined based on relationships between the control instructions. Specifically, the voice controller 190 may be configured to determine the execution order so that control instructions not affected by other control instructions among the plurality of control instructions may be executed simultaneously, and control instructions affected by other control instructions may be executed in sequence. For example, the execution order may be determined so that a control instruction for the air conditioner and a control instruction for the seats S which may be executed simultaneously without any problems are simultaneously executed, and a plurality of control instructions which are necessary to be executed in sequence and necessary for a route search of the navigation device are executed in sequence.

The voice controller 190 may be configured to register a shortcut instruction using the generated control process (515). Specifically, the voice controller 190 may be configured to register the shortcut instruction by storing the shortcut command and the control process in the command database 161. Particularly, the shortcut command denotes the voice command acquired by recognizing the speech of the user, and may be used to execute the shortcut instruction. The control process may be mapped to the shortcut command and stored. Accordingly, a plurality of control instructions may be set as one shortcut instruction, to allow a vehicle to be readily operated without inputting complex control instructions. A method of executing a shortcut instruction will be described in detail below.

Figure 13:
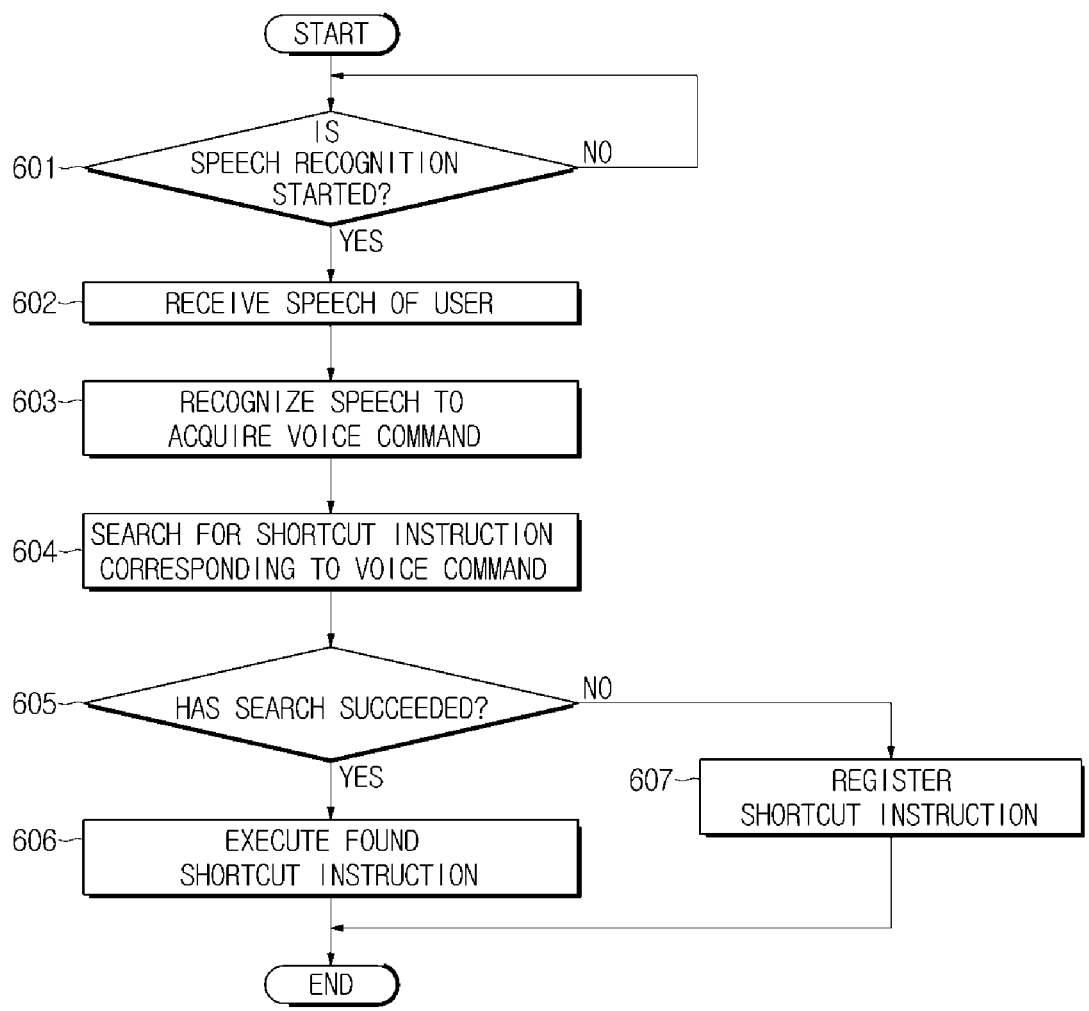
FIG. 13 is a flowchart illustrating a method of executing a vehicular shortcut instruction according to an exemplary embodiment of the present invention.
Figure 14:
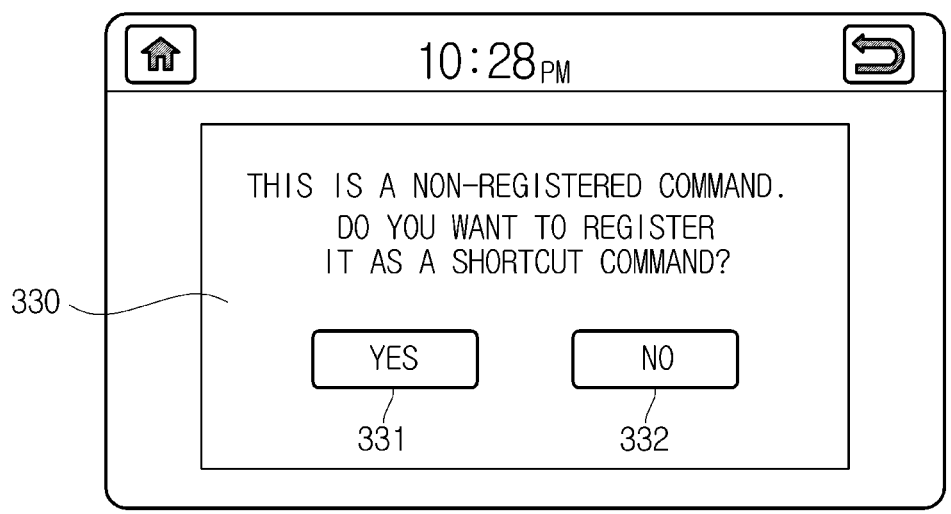
FIG. 14 is an exemplary diagram of a user interface displayed when a search for a shortcut command fails according to an exemplary embodiment of the present invention.
Figure 15:
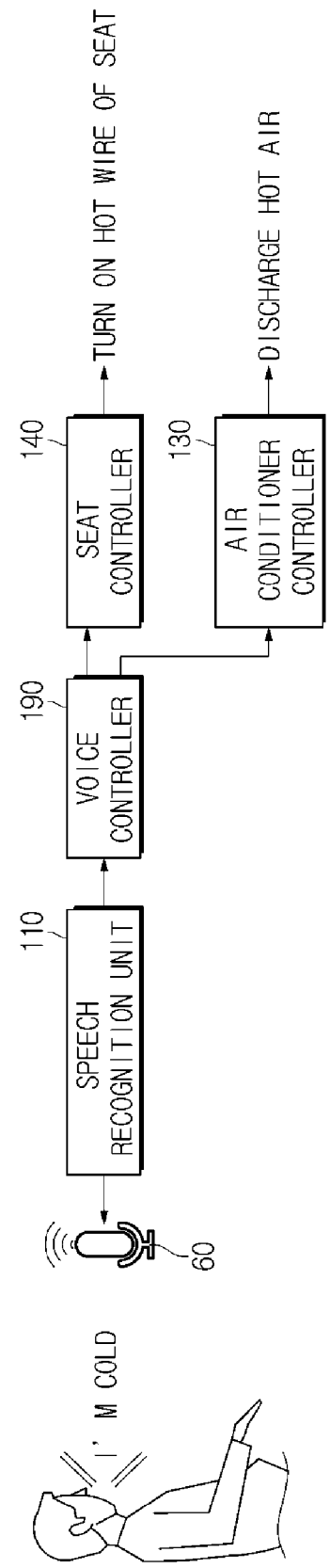
FIG. 15 illustrates an example of executing a shortcut instruction according to an exemplary embodiment of the present invention.
Figure 16:
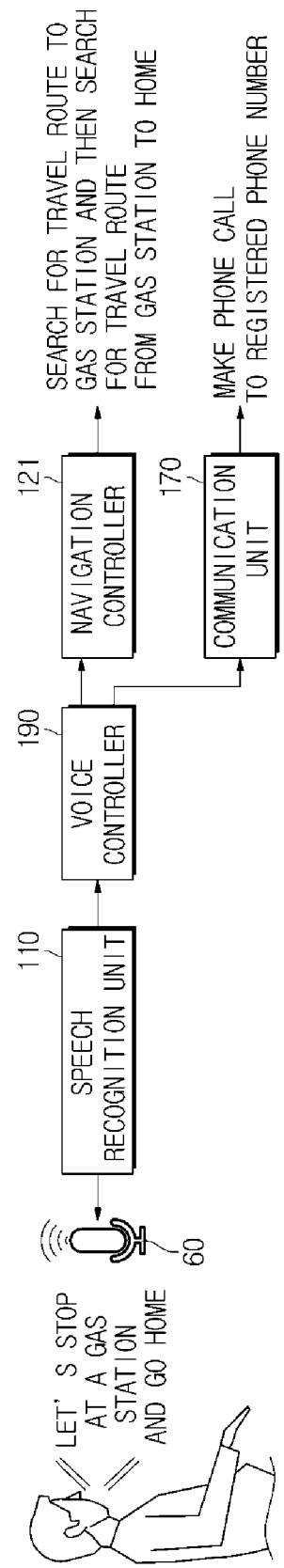
FIG. 16 illustrates another example of executing a shortcut instruction according to an exemplary embodiment of the present invention.

FIG. 13 is a flowchart illustrating a method of executing a vehicular shortcut instruction according to an exemplary embodiment, FIG. 14 is an example diagram of a user interface displayed when a search for a shortcut command fails, FIG. 15 illustrates an example of executing a shortcut instruction, and FIG. 16 illustrates another example of executing a shortcut instruction. Referring to FIG. 13, the vehicle 10 may be configured to determine whether speech recognition is started (601). Speech recognition may be started by receiving a user input or based on a previously set condition. For example, a predetermined time after the vehicle 10 is started, speech recognition may be automatically started.

When speech recognition is started (601), the vehicle 10 may be configured to receive user speech (602) and acquire a voice command by recognizing the received speech (603). As illustrated in FIGS. 15 and 16, the speech of the user may be input through the voice receiving unit 60, and the input speech of the user may be recognized by the speech recognition unit 110 and output in the form of a voice command recognizable by the voice controller 190. The vehicle 10 may then be configured to search for a shortcut instruction corresponding to the acquired voice command (604).

Particularly, the voice controller 190 may be configured to search for a shortcut instruction to be executed by comparing the whole voice command with shortcut commands. For example, when shortcut instructions are registered as shown in FIG. 4, a fourth shortcut instruction may be searched for, for the voice command "It's cold," but no shortcut instruction may be searched for, for the voice command "Let's stop at a gas station and go home." In addition, the voice controller 190 may be configured to search for a shortcut instruction by comparing a part of the voice command with shortcut commands. For example, when shortcut instructions are registered as shown in FIG. 4, a first shortcut instruction that corresponds to a front part of the voice command "Let's stop at a gas station and go home" and a second shortcut instruction that corresponds to a back part of the of the voice command both may be searched for.

When the search of a shortcut instruction succeeds (YES of 605), the vehicle 10 may be configured to execute a detected shortcut instruction (606). Specifically, the voice controller 190 may be configured to execute a plurality of control instructions based on a control process of the detected shortcut instruction. To execute the control instructions, the voice controller 190 may be configured to generate and transfer a control signal to a controller of each component, but a method of executing a control instruction is not limited thereto. For example, each component of the vehicle 10 may be directly operated by the voice controller 190. An execution order of the control instructions may be determined based on execution order information of the control process. Specifically, the plurality of control instructions may be executed simultaneously or sequentially based on the execution order of the control process.

With reference to FIGS. 15 and 16, detailed examples of executing a shortcut instruction will be described below. FIGS. 15 and 16 illustrate examples of executing a shortcut instruction when shortcut instructions are registered as shown in FIG. 4. Referring to FIGS. 4 and 15, the voice controller 190 may be configured to execute a control instruction based on the control process of the fourth shortcut instruction. The voice controller 190 may be configured to determine a shortcut instruction to be executed based on speech input through the voice receiving unit 60. In other words, the voice controller 190 may be configured to execute the control process of a shortcut command that corresponds to the voice command "It's cold" acquired by the speech recognition unit 110.

The voice controller 190 may further be configured to transmit a control instruction for turning on hot wires of the seats S to the seat controller 140, and transfer a control instruction for setting an air conditioner temperature to 29° C. to the air conditioner controller 130. The seat controller 140 that receives the control instruction may be configured to operate the seats S to turn on the hot wires of the seats S, and the air conditioner controller 130 that receives the control instruction may be configured to operate the air conditioner to discharge hot air to adjust the temperature of the vehicle to be 29° C. At this time, an execution order of the control instructions may be determined based on an execution order of the control process. In other words, the control instruction for turning on the hot wires of the seats S and the control instruction for setting the air conditioner temperature to 29° C. may be executed simultaneously or sequentially based on the execution order of the control process.

Referring to FIG. 16, the voice controller 190 may be configured to execute the first shortcut instruction and the second shortcut instruction together. Referring to FIGS. 4 and 16, the voice controller 190 may be configured to determine a plurality of shortcut instructions to be executed based on speech input through the voice receiving unit 60. In other words, the voice controller 190 may be configured to execute the control process of a shortcut command that corresponds to the voice command "gas station" acquired by the speech recognition unit 110 and the control process of a shortcut command that corresponds to "Let's go home." Accordingly, when a plurality of shortcut instructions are executed together, the voice controller 190 may be configured to determine an execution order of the shortcut instructions.

An execution order of shortcut instructions may be determined based on a spoken order of the shortcut instructions. According to this determination method, the first shortcut instruction that corresponds to "gas station" that has been spoken first by the user may be executed first, and then the second shortcut instruction that corresponds to "Let's go home" spoken later by the user may be executed.

Furthermore, the execution order of shortcut instructions may be determined based on analysis results of control processes of the shortcut instructions. For example, control instructions simultaneously executable among control instructions of different control processes may be simultaneously executed, and control instructions necessary to be sequentially executed may be executed in sequence. Accordingly, a control instruction of a first control process that corresponds to "search for nearby gas stations" and a control instruction of a second control process that corresponds to "make a phone call home" may be executed simultaneously, and control instructions, which may not be simultaneously executed, of the first control process that corresponds to "search for nearby gas stations" and a second control process that corresponds to "search for a route to home" may be sequentially executed based on an input order of shortcut instructions.

When control instructions are executed based on an execution order determined in the above-described method, the navigation controller 121 "searches for a travel route to a gas station and then searches for a travel route from the gas station to home," to provide a detected travel route through the display 200. Additionally, the communication unit 170 may "make a phone call to a registered phone number" based on a control instruction. Since it may be possible to operate a vehicle without complex manipulation due to registered shortcut instructions, manipulation convenience of the user may be improved, and accidents that may occur while the user manipulates the vehicle 10 may be prevented.

Referring back to FIG. 13, when the search of a shortcut instruction fails (NO of 605), the voice controller 190 may be configured to register a shortcut instruction (607). Particularly, the display 200 may be configured to display a shortcut instruction search failure popup 330 as shown in FIG. 14. The search failure popup 330 may include a command registration icon 331 and an end icon 332. When the command registration icon 331 is selected, the above-described process for registering a shortcut instruction may be performed, and when the end icon 332 is selected, registration of a shortcut instruction may be terminated.

As may be apparent from the above description, according to the above-described vehicle and method of controlling the vehicle, it may be possible to readily operate the vehicle using speech recognition. Further, since a plurality of control instructions may be executed based on a control process of a registered shortcut instruction, it may be possible to readily execute the plurality of control instructions.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method of controlling a vehicle, comprising:
recognizing, by a controller, a user speech to acquire a voice command;
searching, by the controller, for a shortcut instruction that corresponds to at least a part of the voice command;
executing, by the controller, a plurality of control instructions based on a control process of the shortcut instruction; and
determining, by the controller, an execution order of control processes of detected shortcut instructions when a plurality of the shortcut instructions are detected.

2. The method according to claim 1, further comprising:
executing, by the controller, the plurality of control instructions based on an execution order of the control process.

3. The method according to claim 2, wherein the plurality of control instructions are performed simultaneously or sequentially based on the execution order of the control process.

4. The method according to claim 1, further comprising:
generating, by the controller, control signals that correspond to the plurality of control instructions; and
transferring, by the controller, the control signals to respective components of the vehicle.

5. The method according to claim 1, further comprising:
registering, by the controller, the voice command as a shortcut instruction when any shortcut instruction that corresponds to the voice command is not detected.

6. The method according to claim 5, further comprising:
providing, by the controller, an interface for receiving the plurality of control instructions; and
generating, by the controller, the control process based on the plurality of input control instructions.

7. The method according to claim 6, further comprising:
determining, by the controller, an execution order of the control process based on an input order of the plurality of control instructions.

8. The method according to claim 1, wherein the plurality of control instructions are configured to operate at least one selected from the group consisting of: a navigation function, a multimedia function, an air conditioning function, a seat function, a window function, and a phone connection function.

9. A vehicle, comprising:
a memory configured to store program instructions; and
a processor configured to execute the program instructions, the program instructions when executed configured to:
recognize a user speech to acquire a voice command;
search for a shortcut instruction that corresponds to at least a part of the voice command; and
execute a plurality of control instructions based on a control process of a detected shortcut instruction,
wherein, when a plurality of shortcut instructions are detected, the program instructions are configured to determine an execution order of the plurality of shortcut instructions.

10. The vehicle according to claim 9, wherein the plurality of control instructions are executed based on an execution order of the control process.

11. The vehicle according to claim 10, wherein the plurality of control instructions are performed simultaneously or sequentially based on the execution order of the control process.

12. The vehicle according to claim 9, wherein the program instructions when executed are further configured to generate control signals that correspond to the plurality of control instructions and transfer the control signals to respective components of the vehicle.

13. The vehicle according to claim 9, wherein the program instructions when executed are further configured to register the voice command as a shortcut instruction when any shortcut instruction that corresponds to the voice command is not detected.

14. The vehicle according to claim 13, further comprising: a display configured to provide an interface for inputting the plurality of control instructions.

15. The vehicle according to claim 14, wherein the interface includes a state display area for displaying information on a currently displayed screen.

16. The vehicle according to claim 14, wherein the program instructions when executed are further configured to generate the control process based on the plurality of control instructions input through the display.

17. The vehicle according to claim 16, wherein the program instructions when executed are further configured to determine an execution order of the control process based on an order in which the plurality of control instructions are input.

18. The vehicle according to claim 9, wherein the plurality of control instructions are configured to operate at least one selected from the group consisting of: a navigation function, a multimedia function, an air conditioning function, a seat function, a window function, and a phone connection function.

19. The vehicle according to claim 9, wherein the memory includes a command database configured to store a plurality of shortcut instructions.

* * * * *